Jan. 30, 1968  H. A. SAPP  3,366,100

INTERNAL COMBUSTION ENGINES

Filed Jan. 3, 1966

INVENTOR
HAROLD ALBERT SAPP
BY: Jacobs & Jacobs
ATTORNEYS

United States Patent Office 3,366,100
Patented Jan. 30, 1968

3,366,100
INTERNAL COMBUSTION ENGINES
Harold Albert Sapp, Ormesby, Middlesbrough, Yorkshire, England, assignor of one-half to William Ashton Stainsby, Stockton-on-Tees, England
Filed Jan. 3, 1966, Ser. No. 518,384
6 Claims. (Cl. 123—198)

ABSTRACT OF THE DISCLOSURE

The purpose of this invention is to provide a control valve which will shut off the supply of fuel to an engine in the event of lubrication failure.

---

This invention relates to internal combustion engines using liquid or gaseous fuel.

When a lubrication failure occurs in an internal combustion engine, as it not infrequently does for a variety of causes, for example, burst lubricant pipes, choked filters or simply consumption of the lubricant, extensive damage may be caused. The consequent overhaul and reconditioning of the engines, particularly in the case of heavy engines as used under adverse weather conditions in earth moving equipment and the like industrial vehicles, and in air compressors, is very costly. Thus, means to prevent or minimise the effects of lubrication failure affords a valuable economy in the maintenance cost of engines, and it is an object of the invention to provide such means.

Accordingly the invention provides a device insertable in the fuel supply duct of an internal combustion engine, and comprising a fuel valve, a displaceable member connected with said valve, means for subjecting said displaceable member to the pressure of the engine lubricant, and resilient means opposed to said displaceable member, such that while the lubricant pressure upon said displaceable member is effective the valve is held open, and in the event of loss or reduction of such pressure the resilient means closes the valve.

The effect of a valve device as recited is to cut off the supply of fuel to the engine in the event of lubrication failure, and thereby to avoid the occurrence of damage due to the engine running short of lubricant.

Preferably the displaceable means is a flexible diaphragm secured by its periphery in a fluid tight chamber having a branch to which a pipe from the pressure side of the lubricant circulating system is attachable, the diaphragm having a stem in engagement with the fuel valve.

In order to permit priming of an engine with fuel for starting, the device may include means to enable the opening of the fuel valve regardless of the position of the displaceable member, which is connected with the valve by means effective unidirectionally to cause the valve to open, the valve also having an associated element effective in the same direction whereby the valve is temporarily displaceable. In such means, the displaceable member may have a stem which bears under compression or alternatively under tension upon the valve in opposition to the resilient means, and the valve also has an associated tension or alternatively compression element whereby it is temporarily displaceable independently of said stem, under straining of the resilient means, to open the valve in order to permit a priming flow of fuel.

The invention is applicable to petrol engines and diesel engines. The carburettor of a petrol engine will usually contain a supply of fuel sufficient to enable the engine to start running and build up a sufficient lubricant pressure to open the fuel valve in a device as aforesaid, so that priming is not necessary on normal starting. In the case of a diesel engine, to provide sufficient fuel for normal starting the device may include or be associated with a priming reservoir comprising a small chamber on the engine side of said fuel valve, having at its upper part a valve adapted to close under the fuel supply pressure, or to open in the absence of such pressure to permit the expulsion of air from said reservoir chamber and so avoid the occurrence of an air lock in the fuel supply. Such a reservoir may also be provided between the fuel valve and a carburettor of a petrol engine, desirably with an outlet stopcock, to provide sufficient petrol to replenish the carburettor in the event of leakage or evaporation of fuel therefrom while the engine is standing idle.

In order that the invention may be better understood, embodiments thereof will be described, by way of example, with reference to the accompanying drawings wherein.

Figure 1:
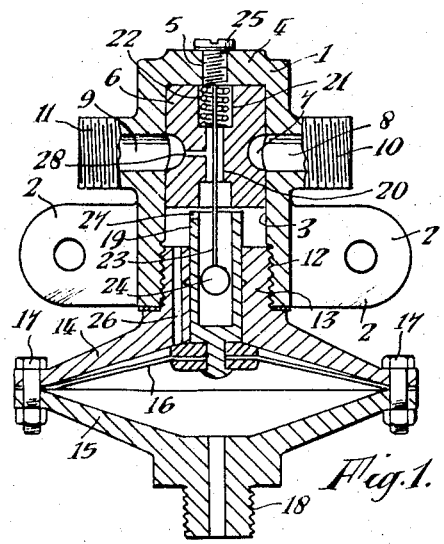
FIG. 1 is a diametrical section of one embodiment of a device for controlling the flow of fuel.

In the embodiment shown in FIG. 1, the device comprises a valve casing 1 attachable to or mountable adjacent the carburettor or fuel pump of an engine by suitable lugs 2. The casing has a cylindrical bore 3 open at its lower end and with a closure 4 at its upper end that has a small central screw threaded hole 5. A piston valve 6 is slidable in the bore 3 and has an annular groove 7 so located that when the valve is at the upper end of the bore said groove registers with two diametrically opposed ports 8, 9 in the casing. Externally of said ports the casing has two screw-threaded spigots 10, 11 to which are attachable respectively a pipe from the fuel supply source and a pipe leading to the carburettor or fuel pump.

The open lower end of the casing has a screw-thread 12 with which is engageable a correspondingly threaded boss 13 of a diaphragm housing. Such housing comprises two opposed domed or conical elements 14, 15 with the periphery of the diaphragm 16 secured between their rims by bolts 17, the element 14 having the aforesaid threaded boss 13 coaxially at its centre, and the other element 15 having a branch 18 to which is attachable a pipe connected into the pressure side of a lubricant circulation system.

Thus the underside of the diaphragm is adapted to be subjected to lubricant pressure whereby it is displaceable upwardly, and there is attached to the upper side of the diaphragm a hollow stem 19 which bears upon the underside of the valve 6 to lift it so that its annular groove 7 is in register with the fuel feed ports 8, 9 so long as the lubricant pressure exists.

For closing the valve 6 in the event of lubricant failure, it has an axial bore 20 with a larger upper part 21 in which is located a compression coil spring 22 bearing upon the top closure of the casing about the hole 5. Depending through said axial bore 20 is a wire or rod 23 having at its lower end a nipple 24 which is normally located in said hollow stem 19 on the diaphragm, the upper end of said wire or rod being attached to a screw 25 inserted in the screw-thread hole 5 in the top of the casing. The head of the screw 25 is adapted for manual rotation, for example, by being slotted or knurled.

Whenever the lubricant pressure fails, the spring 22 depresses the piston valve 6 to cut off the fuel feed, and also depresses the diaphragm 16. In the event of such depression of the valve occurring after a normal stopping of the engine, it is possible to prime the carburettor or fuel pump by withdrawing the screw 25 at the top of the casing, and thereafter lifting the screw so that the nipple 24 on the depending wire or rod 23 lifts the piston valve until its annular groove 7 registers with the fuel ports 8 and 9. Thus the engine can be started, and when the lubricant pressure has built up the screw 25 can be reinserted to leave the valve 6 under the sole control of the opposing forces exerted on it by the diaphragm 16 and the spring 22.

Of course, if there has been a lubricant failure, the starting of the engine will not cause the diaphragm to hold the valve in its lifted position, and the engine will again stop.

To permit the valve 6 and the diaphragm 16 to move freely, a vent is provided from the space above the diaphragm to the fuel passage by way of a small bore 26, parallel to the axis, through the boss 13, a small radial port 27 at the upper end of the hollow stem 19, and a radial bore 28 from the axial bore 20 to the annular groove 7 in the piston 6.

Figure 2:
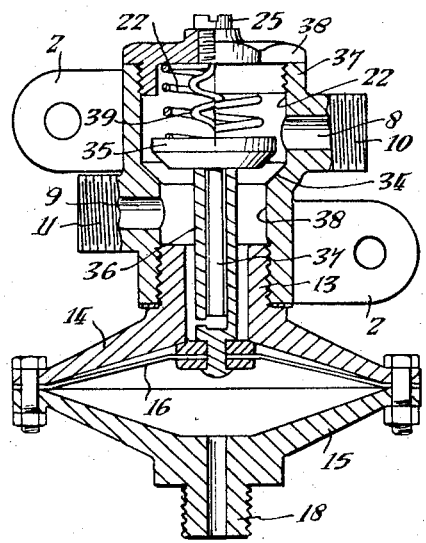
FIG. 2 is a like section of another embodiment of such device.

In the embodiment shown in FIG. 2, wherein corresponding parts have the like reference numerals, a modified body 31 has a bore with a larger upper part 32 open at its upper end, a lower smaller part 33 into which is screwed the boss 13 of the diaphragm housing, and a conical shoulder 34 between said two parts of the bore which acts as a seat for a mushroom type valve 35. The lateral ports 8 and 9 are located respectively above and below the valve seat 34 so that communication between them is afforded when the valve is open. The hollow stem 36 secured to the diaphragm 16 slidably surrounds a stem 37 of the valve 35. The upper end of the body 31 is closed by a plug 38 with a screwed skirt and the valve spring 22 bears between this plug and the valve. At its centre the plug 38 has a screw-threaded hole 5 in which is located a screw 25 attached by a flexible wire or chain 39 to the valve 35 so that for priming the engine the screw 25 can be withdrawn to straighten the wire or chain 39 and thereafter lift the valve 35 into engagement with the skirt of the plug 38, to permit a priming flow of fuel from the port 8 to the port 9. In this arrangement the space above the diaphragm 16 in its housing is in free communication with the fuel port 9.

Figure 3:
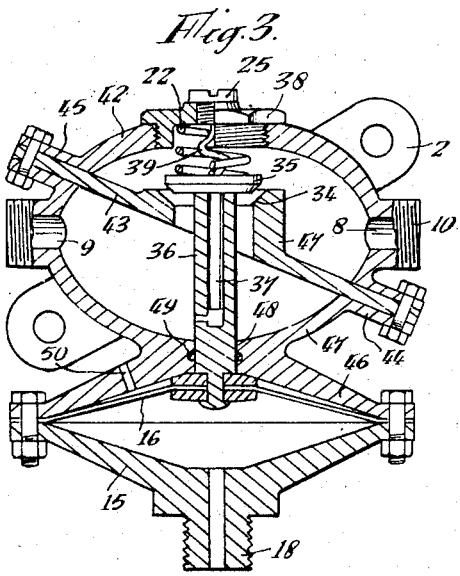
FIG. 3 is a like section of yet another embodiment of the device.

FIG. 3 shows a further modified embodiment wherein the valve body is ovoid and divided by a partition presenting a valve seat. In this embodiment the upper part 46 of the diaphragm housing is made integral with a lower part 41 of the ovoid body, which is divided on an oblique plane and further comprises an upper part 42 and a partition 43 secured between flanges 44, 45 on said body parts. The fuel inlet and outlet ports 8 and 9 are provided respectively in said body parts 41 and 42. The partition 43 has a boss 47 which presents the seat 34 for the valve 35 coaxially with the hollow stem 36 secured to the diaphragm 16, and the stem 37 of the valve is slidable in said hollow stem 36. In this arrangement, however, said stem 36 is housed slidably within a bore 48 at the junction of the body and housing parts 41, 46 with a seal ring 49 to prevent leakage of fuel, and in order to permit free movement of the diaphragm 16 the space above it in the housing is provided with an air vent 50 through the part 46.

In this embodiment the arrangement of the valve 35 and its stem 37 relative to the hollow stem 36 on the diaphragm, and of the plug 38 in the upper part 42 of the ovoid body, the flexible wire or chain 39 and the screw 25 in the plug 38 are as described with reference to FIG. 2. The device as shown in FIG. 3 evidently operates under lubricant pressure on the diaphragm 16, and is adapted for manual priming by lifting of the valve 35 by means of the screw 25 and wire or chain 39, in the manner hereinbefore described.

Figure 4:
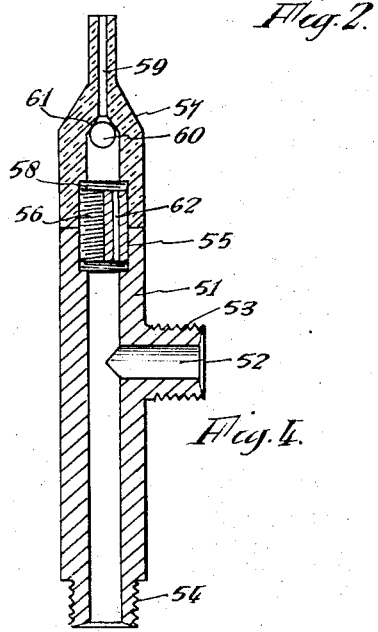
FIG. 4 is a diametrical section of a priming reservoir.

A reservoir to hold sufficient fuel to enable starting after a normal stoppage, particularly of a diesel engine, as shown in FIG. 4, comprises a body 51 connectable between the outlet port 9 of the valve casing and the fuel pump. This body 51 is a hollow cylinder with a lateral inlet port 52 within a screw-threaded spigot 53, and a screw-thread 54 to receive an outlet union at its lower end. The upper end of the cylinder has an internal screw thread 55, in which is secured a screwed body 56, and a cap 57 having an internal screw thread 58 is secured upon said body 56. The cap is hollow, and its upper part presents a valve seat 61 with a central hole 59 which is normally closed by a light ball 60 housed within the cap, this ball being floated against the seat by the fuel under supply pressure, even a small static head. The body 56 serves as a retainer for the ball, which falls from the seat in the absence of fuel under the supply pressure, and said body has a longitudinal vent bore 62 located so that it cannot be closed by the ball. Thus the ball is free to permit venting of air should an air lock occur in the fuel feed, but when the fuel supply is under pressure the ball will be lifted to close the vent and prevent leakage.

A reservoir as aforesaid may be incorporated in the casing of the valve device as a unitary component thereof.

Figure 5:
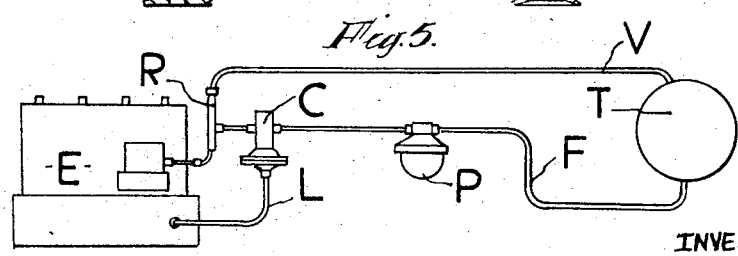
FIG. 5 is a diagram illustrating the application of means provided by the invention to an internal combustion engine.

Apparatus as described may be applied as diagrammatically shown in FIG. 5 to an internal combustion engine E, whether of the petrol or diesel type. A fuel supply control device C, which may be as described with reference to any of FIGS. 1–3, and a priming reservoir R as shown in FIG. 4, are connected in the fuel supply line F between the engine and a priming supply pump P which delivers the fuel from tank T. A vent line V from the reservoir R goes to the top of the tank T, and a lubricant pipe L taken from the pressure side of a lubricant pump (not shown) in the engine, is connected to the bottom of the diaphragm housing in the device C.

The device for fuel control according to the invention is applicable to an engine having splash or equivalent pressureless lubrication, by the provision on the engine of a pump which takes lubricant from the engine sump and circulates it by way of a duct, having a branch connected to the diaphragm housing, through a pressure regulating valve back to the sump.

The device is also applicable to a gas engine, when suitably modified, for example, by means to permit the fuel valve to be held open temporarily during normal starting, a reservoir as above referred to being omitted; alternatively, the device may include or be associated with a reservoir having no vent, and large enough to contain a sufficient quantity of gas for starting and running until the lubricant pressure normally has built up to hold the fuel valve open.

I claim:

1. A control device insertable in the fuel supply duct of an internal combustion engine, comprising a fuel valve, a displaceable member connected with said valve, means for subjecting said displaceable member to the pressure of the engine lubricant, a compression spring opposed to said displaceable member such that while the lubricant pressure upon said displaceable member is effective the valve is held open and in the event of loss or reduction of such pressure the compression spring closes the valve, said displaceable member having a stem which bears under compression upon one side of the valve and said compression spring bearing upon the other side of the valve, the device further comprising a body wherein said valve is housed, fuel inlet and outlet ports in said body disposed so that the valve when displaced by said displaceable member affords passage for fuel from the inlet port to the outlet port, a tapped bore in said body coaxial with the valve, a screw inserted in said bore, and a tensile element connected to said screw and said valve and affording lost motion to enable withdrawal of said screw from said bore and thereafter temporary displacement of said valve, under straining of said spring, for opening of said valve to permit a priming flow of fuel.

2. A control device insertable in the fuel supply duct of an internal combustion engine comprising a body, a cylinder in said body, fuel inlet and outlet ports in communication with said cylinder, a piston forming a fuel valve being housed in the cylinder and having a duct located to afford passage for fuel from the inlet port to the outlet port when the valve is open, a displaceable member connected with the valve, means for subjecting said displaceable member to the pressure of the engine lubricant, such that while the lubricant pressure upon said displaceable member is effective the valve is held open, a compression spring opposed to said displaceable member such that in the event of loss or reduction of such pressure the compression spring closes the valve, said displaceable member having a hollow stem which bears under compression coaxially upon one side of said piston valve and said compression spring bearing upon the other side of the valve, the device further comprising a tapped bore in said body coaxial to the valve, a screw inserted in said tapped bore, an axial bore in the valve, a tensile element connected to said screw and extending through said axial bore into said hollow stem, a nipple on said tensile element located within said stem and spaced from the side of the valve upon which said hollow stem bears, the spacing of said nipple from the valve affording lost motion to enable withdrawal of said screw from said tapped bore and thereafter engagement of said nipple with the valve to effect temporary displacement of said valve, under straining of said spring, for displacing said valve to permit a priming flow of fuel from said inlet port to said outlet port.

3. A control valve insertable in the fuel supply duct of an internal combustion engine, comprising a body, an annular valve seat presented within said body, a fuel valve formed by a mushroom-type valve bearing upon said seat, fuel inlet and outlet ports in said body located on opposite sides of the valve, said valve when open affording passage for fuel from the inlet port to the outlet port, a displaceable member connected with said valve, means for subjecting said displaceable member to the pressure of the engine lubricant and a compression spring opposed to said displaceable member such that while the lubricant pressure upon said displaceable member is effective the valve is held open and in the event of loss or reduction of such pressure the compression spring closes the valve, said displaceable member having a stem bearing under compression upon the side of said valve which engages the seat and said compression spring bearing on the other side of the valve, the device further comprising a tapped bore in said body coaxial with the valve, a screw inserted in said tapped bore and a slack tensile element connecting said screw to said other side of the valve, the slackness of said tensile element affording lost motion to enable withdrawal of said screw from said tapped bore and thereafter lifting of the valve from its seat to permit a priming flow of fuel from said inlet port to said outlet port.

4. A control device insertable in the fuel supply duct of an internal combustion engine in combination with a priming reservoir, said device comprising a fuel valve, a displaceable member connected with said valve, means for subjecting said displaceable member to the pressure of the engine lubricant, resilient means opposed to said displaceable member such that while the lubricant pressure upon said displaceable member is effective the valve is held open and in the event of loss or reduction of such pressure the resilient means closes the valve, said priming reservoir comprising a small chamber on the engine side of said fuel valve, a closure member at the upper part of said chamber, an air inlet in said closure member, a float valve adapted to close said vent under the fuel supply pressure and to open in the absence of such pressure to permit the expulsion of air from said reservoir chamber and so avoid the occurrence of an air lock in the fuel supply.

5. A control device insertable in the fuel duct of a pressure feed supply to an internal combustion engine and comprising a fuel valve, a chamber below said valve, a deformable diaphragm clamped at its periphery to the chamber periphery to provide a sealing wall across said chamber, an abutment member extending between said valve and the diaphragm and resilient means bearing upon the valve to urge it downwards and so maintain it in engagement with the diaphragm through said abutment member, the chamber space below said diaphragm being connectable to the engine lubrication pressure system to provide an upwards force on the diaphragm against said resilient means to urge the valve through an open position while said lubricant pressure acts, a vent connection being provided to the chamber space above said diaphragm permitting free communication between said space and the outlet side of the valve wherein the valve body is of mushroom form and comprises a stem projecting downwards from the valve head, said abutment member comprising a tubular portion within which said stem seats, an aperture being formed in said tubular portion to extend from the underside of said stem within the abutment member to the exterior of the abutment member and the outlet side of the valve being in communication with said exterior end of the aperture.

6. The combination of control device and a priming reservoir as claimed in claim 4, wherein said reservoir comprises a body enclosing a cylindrical chamber, fuel inlet and outlet ports in said body, a tapped bore in the upper end of said chamber, a screwed plug partly inserted in said tapped bore, said closure member having at its lower part a tapped bore engaged upon the part of said screwed plug protruding from said body, and a vent bore in said plug parallel to and displaced from the axis so as to be incapable of closure by said float valve.

References Cited
UNITED STATES PATENTS 3,148,671 9/1964 Bottorff et al. _____ 123—198
3,202,143 8/1965 Goodwin _____ 123—41.15

FOREIGN PATENTS 1,140,029 2/1957 France.
833,143 3/1952 Germany.
466,430 5/1937 Great Britain.

WENDELL E. BURNS, *Primary Examiner.*